Jan. 17, 1956  J. B. COLLINS  2,730,807
MEASURING DEVICE

Filed Aug. 9, 1951  3 Sheets-Sheet 1

INVENTOR.
Jack B. Collins
BY
Oly r Frye
Attys-

Jan. 17, 1956  J. B. COLLINS  2,730,807
MEASURING DEVICE
Filed Aug. 9, 1951  3 Sheets-Sheet 2

INVENTOR.
Jack B. Collins
BY
Elyr Frye
Attys-

Jan. 17, 1956  J. B. COLLINS  2,730,807
MEASURING DEVICE

Filed Aug. 9, 1951  3 Sheets-Sheet 3

INVENTOR.
Jack B. Collins
BY Ely + Frye
Attys-

United States Patent Office 2,730,807
Patented Jan. 17, 1956

2,730,807

MEASURING DEVICE

Jack B. Collins, Esleworth, England, assignor to The Firestone Tire & Rubber Company, Akron, Ohio, a corporation of Ohio Application August 9, 1951, Serial No. 241,039

9 Claims. (Cl. 33—125)

This invention relates to the continuous measurement of the width of moving sheet material and more particularly to the measurement of the width of rubber coated tire ply stock as it leaves the calender.

In the manufacture of ply stock for use in building tires, a fabric is coated with rubber by passing it between calender rolls which deposit thin layers of rubber onto each side of the fabric. Some care must be exercised in maintaining a constant width of the calendered stock to avoid difficulties in the tire building operation. If the tension exerted on the fabric in the calendering operation is not controlled, excessive variations in width will result. It is desirable, therefore, to continuously measure the width of the stock as it leaves the calender rolls to help control the calendering operation. Heretofore the width of such stock has been measured by means engaging the edges of the stock, but this has proved unsatisfactory because the unsupported edges of the fabric tend to deflect and give false readings and because the edges are often damaged by such apparatus.

A general object of the invention is to provide apparatus which will continuously measure and accurately indicate the width of calendered tire ply stock or other material.

A more specific object is to provide measuring apparatus which will not damage the edges or the surface of the fabric.

Another object of the invention is to provide apparatus which will retain accurate calibration and which will operate with a minimum of maintenance and adjustment.

Another object is to provide apparatus which will measure the width of moving sheet independently of any lateral shifting of the sheet.

Another object is to provide measuring apparatus which will be easy to construct and install, which will have a low initial cost, and a long operating life.

These and other objects are accomplished in the present invention by providing apparatus which comprises a plurality of closely spaced rollers which are disposed in two banks adjacent to and spanning the marginal portions of the moving strip of fabric as it passes over a supporting drum. The rollers are connected in an electrical circuit in such a manner that each roller in contact with the fabric operates a relay to pass a predetermined accurately measured amount of current into a measuring circuit. The wider the sheet, the greater will be the number of rollers in contact therewith and the greater will be the current flowing in the circuit. The total current flowing in the measuring circuit thus is used to indicate the width of the fabric. The method has proved to be reliable and accurate.

Further objects and advantages will be more apparent from the following description of a preferred form of the invention, reference being had to the accompanying drawings in which.

Figure 1:
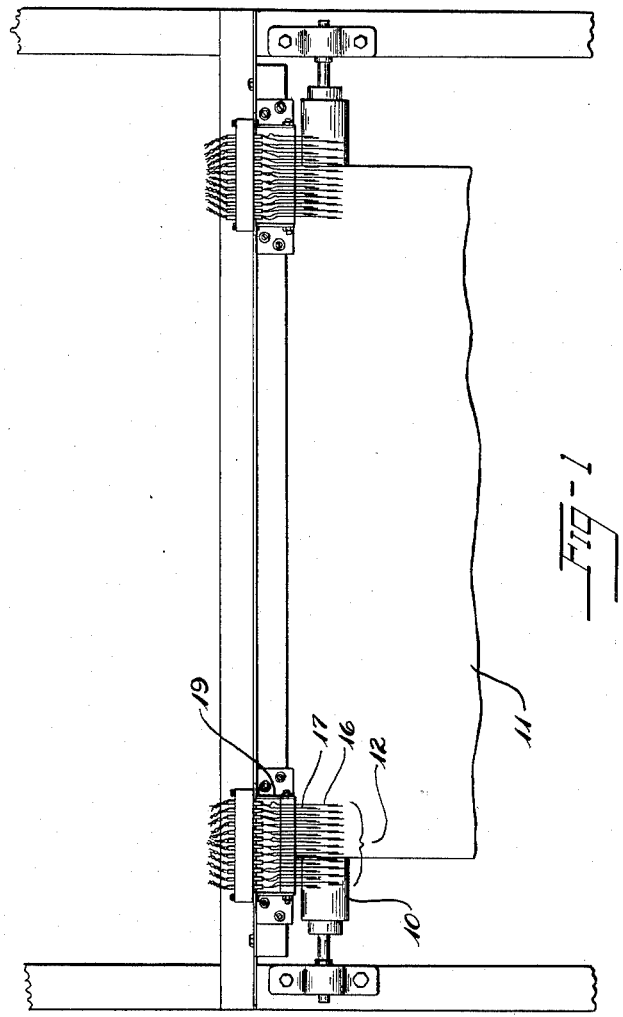
Figure 1 is a top elevation showing the calendered fabric passing over a supporting drum with the two banks of rollers in contact therewith.
Figure 2:
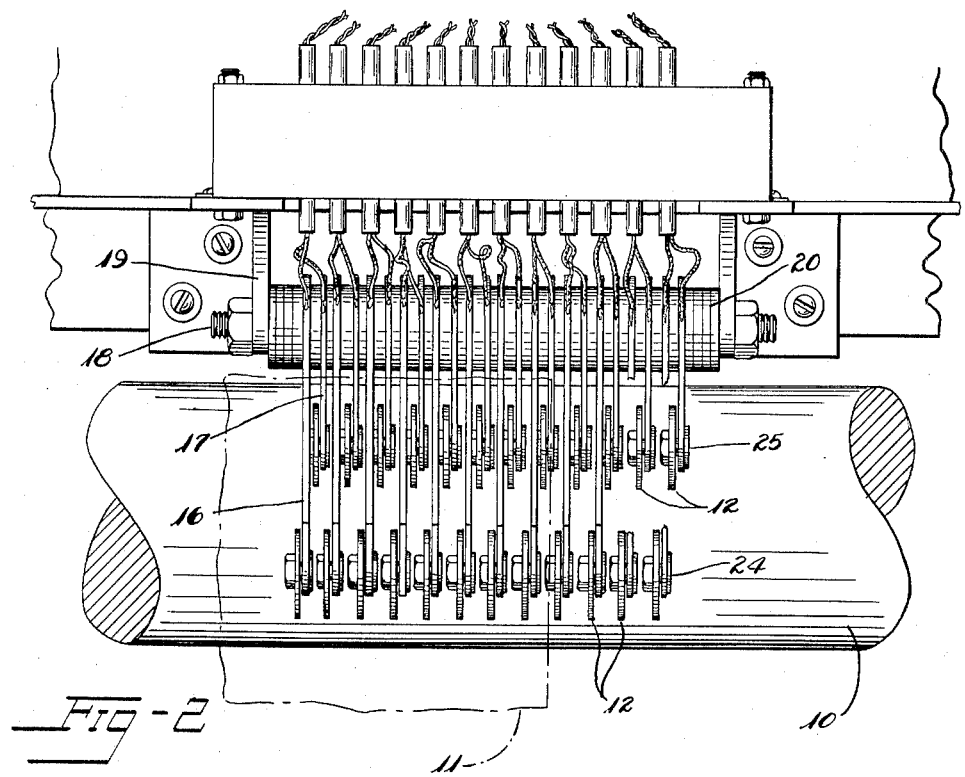
Figure 2 is a plan elevation on an enlarged scale showing the details of mounting the rollers.
Figure 3:
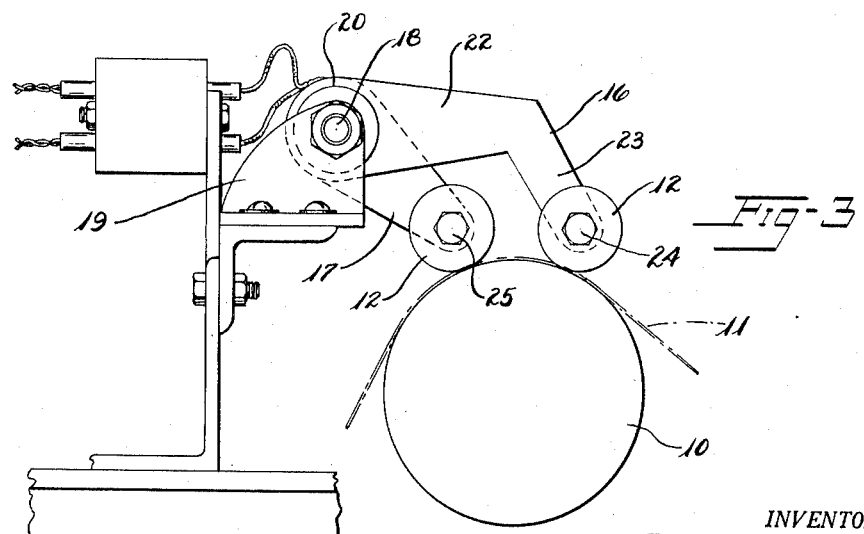
Figure 3 is an end elevation of the apparatus of Figure 2.

A preferred form of apparatus embodying the invention, as shown in Figure 1, comprises a metal drum 10 over which a continuously moving web of calendered fabric 11 is passed. A plurality of metal rollers 12 are mounted adjacent the marginal portions of the fabric in a position to contact either the fabric or the supporting drum depending upon the width of the sheet. As will be seen later, the rollers 12 and the supporting drum 10 comprise the elements of electric switches which indirectly regulate the amount of current flowing in an electric measuring circuit. The wider the fabric, the greater will be the number of contact rollers in contact with the fabric and the greater will be the current flowing in the measuring circuit. The current is thus a direct indication of the width of the fabric.

In order to measure fabric widths to an accuracy of a quarter of an inch, two banks of 24 rollers per bank are disposed adjacent the margins of the strip. The rollers of each bank are in the form of flat, metal disks. They are arranged in two staggered rows of 12 rollers each and are mounted alternately on metal arms 16 and 17 pivotally secured to a supporting bar 18 which, in turn, is supported in a bracket 19 positioned adjacent the drum. Each arm and roller is urged by gravity into contact with the drum.

The bar 18 is of insulating material and the arms are separated from each other by insulating washers 20. Likewise, the mounting as a whole is insulated from the ground to insure proper electrical functioning of the apparatus.

The arms 16 which support the outer row of rollers are preferably of stamped sheet metal and have forwardly extending portions 22 which terminate in depending portions 23 at the ends of which the rollers are journalled as indicated at 24. The arms 17 are somewhat shorter than arms 16 and extend diagonally downward with their rollers journalled as at 25 to the rear of the rollers mounted on arms 16 as shown. As mentioned above, the arms 16 and 17 alternate with each other so that their respective roller contacts are staggered. The spacing of the rollers in each row from center line to center line is ½ inch. This arrangement permits an effective roller spacing of ¼ inch, permitting the width of the fabric to be measured to this accuracy. Each bank of 24 rollers covers a span of six inches, and the two banks are spaced apart a distance of 50¼ inches, giving the apparatus a capacity of measuring fabric from 50 to 62 inches in width. The roller and bank spacing may be varied to suit the particular requirements of use.

Assuming that the calendered fabric is to have a desired width of 58 inches, it will be apparent that as the fabric passes over the supporting drum, thirty-two of the rollers will be in contact with the fabric and sixteen will be in contact with the drum 10. It is not necessary that the fabric be accurately centered in relation to the two banks of contacts so long as it does not deviate so much from the center line of the apparatus as to extend beyond one of the banks of rollers. In the present example, it would be possible for the fabric to be off center so that all twenty-four rollers of one bank and but eight rollers of the other bank would be in contact with the fabric. In such a case, the same total number of rollers would be effected, and, as will be seen later, the width reading would remain the same. The measuring apparatus is thus independent of any reasonable amount of lateral shifting of the fabric as it passes over the supporting drum and is thus independent of the position of the edges of the fabric.

Figure 4:
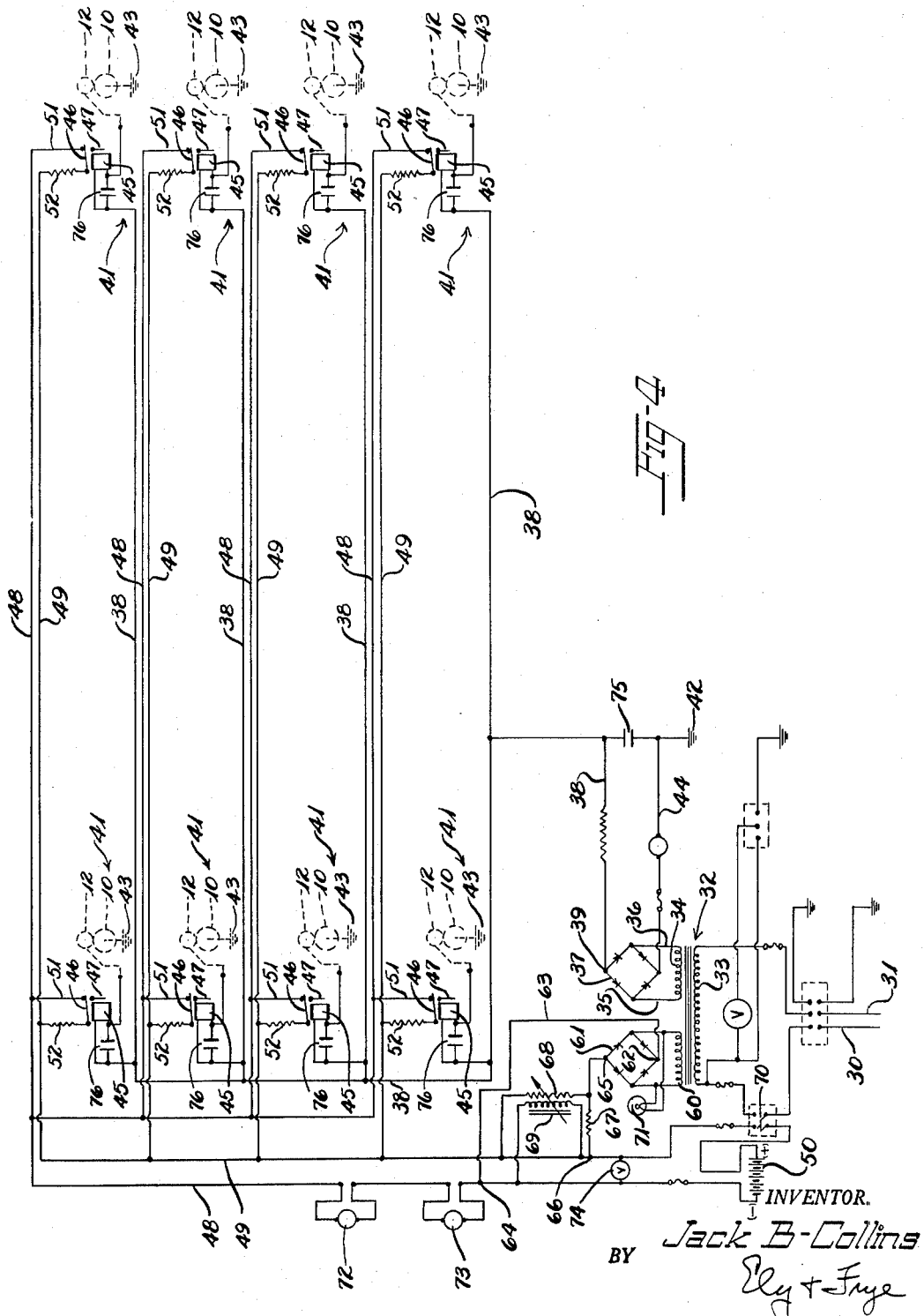
Figure 4 is a wiring circuit illustrating the manner of operation of the apparatus.

The electrical circuits by which the number of rollers in contact with the fabric measures the width of the sheet have been briefly referred to above. A preferred wiring arrangement which effects this measurement is illustrated in Figure 4. It comprises two main circuits: a circuit, termed the measuring circuit, in which the flow of current is measured as a direct indication of the width of the fabric; and a second circuit, termed the relay energizing circuit, which is controlled by the interaction of the fabric and the rollers referred to above. The two circuits are linked together so that the rollers will operate relays to bring standard resistances into and out of the measuring circuit to regulate the current flowing therein in accordance with the width of the fabric.

The relay energizing circuit which includes the banks of rollers and the supporting drum may be traced at the righthand side of Figure 4. The circuit draws power from the power lines 30 and 31, which are connected to a source of alternating current, through a transformer 32 which includes primary 33 and the secondary 34. The secondary 34 is connected by the lines 35 and 36 to the terminals of a bridge-circuit rectifier 37. Line 38 leads from one of the outlet terminals 39 of the rectifier to the rollers 12 which are connected in parallel branch circuits 41. The supporting drum 10 is grounded as indicated at 43. The other outlet terminal of the bridge-circuit rectifier is connected by line 44 to the ground as indicated at 42. It will be seen that current flows in line 38 and in the respective branch circuits 41 whenever one or more of the rollers 12 is in contact with the drum, but does not flow in a branch circuit when the respective roller 12 is insulated from the drum by the calendered fabric. Each of the branch circuits 41 in addition has a solenoid 45 forming part of relay 47 having a function and purpose to be described in detail later.

The measuring circuit which may be traced at the left of Figure 4, includes a pair of lines 48 and 49 which draw their power from a battery 50 and which are connected by a plurality of parallel resistance circuits 51, each of which includes a fixed resistance 52 having a value of 6,000 ohms and a switch 46 which when open throws the fixed resistance out of the measuring circuit. The switches 46 with solenoids 45 comprise relays 47. A relay will be energized to open its switch 46 whenever current flows in the respective branch circuit 41 of the relay energizing circuit, i. e., whenever a roller 12 is in contact with the drum, and will be deenergized whenever a roller is in contact with the fabric. In the latter case, the switch 46 of the relay will be closed, and the measuring circuit will have a corresponding resistance of 6,000 ohms for each such roller in contact with the fabric. As a result, the current which flows in the measuring circuit is a direct measure of the number of roller contacts touching the fabric and hence is a direct measure of the width of the fabric.

The measuring circuit is supplied with a constant voltage of 12 volts by the battery 50 which preferably is an 8 cell 25 ampere-hour nickel-cadmium alkaline battery having a rated voltage of 12 volts. To insure that the battery will maintain the required constant potential, the battery is maintained on a continuous trickle charge by a secondary circuit which includes the secondary 60 of transformer 32 which is connected to a second bridge-circuit rectifier 61. One of the outlet terminals 62 of the rectifier is connected by line 63 to the negative side of the battery (as at 64) and the other terminal 65 of the rectifier is connected to the positive side of the battery (as at 66) through a parallel circuit which includes a fixed resistance 67 of 13.5 ohms and a variable resistance 68 which preferably takes the form of a carbon pile mechanically connected to a solenoid 69 which is connected across the terminals of the battery. The arrangement is such that the trickle charge which passes through resistance 67 takes care of the almost constant load of the carbon pile, while the carbon pile and solenoid operate to vary the trickle charge as demanded by the battery. For example, if the battery voltage tends to rise above 12 volts, the solenoid 69 will operate to increase the resistance of the carbon pile 68 and decrease the trickle charge to the battery thus limiting the battery voltage. If the battery voltage tends to fall below 12 volts, the solenoid will operate to decrease the carbon pile resistance, and increase the trickle charge to the battery to bring the battery voltage up to normal. With this arrangement a substantially constant voltage of 12 volts will be maintained in the measuring circuit, so that when one of the standard 6,000 ohm resistances is brought into or removed from the circuit, a proportional and constant change in the measuring current will take place. A single throw, two pole switch 70 is manually operable to energize the circuits and a light 71 is provided to indicate such energization.

The current flowing in the measuring circuit is measured by two ammeters 72 and 73 inserted in series in line 48 of the circuit. Ammeter 72 has a dial calibrated to indicate the current in inches of fabric width, while ammeter 73 reads directly in amperes to provide a check on the apparatus. If desired, conventional recording apparatus (not indicated) may be connected to the ammeters. A check on the voltage delivered by the battery is provided by voltmeter 74 connected across lines 48 and 49.

Referring back to the relay energizing circuit, several means are provided to insure dependable operation of this circuit. Thus a capacitance indicated at 75 is connected across the outlet terminals of the rectifier in order to take care of any surges in power and to smooth out the pulses of full wave rectification. A capacitance 76 is also shunted across each of the relays 47 to prevent the relays from fluttering open and shut in response to any mechanical vibration or chatter of the rollers. For example, the rollers might make intermittent contact with the drum, thus giving a varying and false width reading, because of the tendency of an oval-shaped roller to bounce or because dirt on the drum or on the rollers would break the contact. In any case, the capacitance connected across each relay respectively will tend to smooth out any pulses in the relay energizing circuit due to such causes and will permit a relay to become deenergized only after its roller is out of contact with the drum for a significant period of time.

In operation, assume that fabric having a desired standard width of 58 inches is passing over the drum 10, and that switch 70 is closed to supply power to the apparatus. As mentioned above, thirty-two of the rollers 12 will be in contact with the fabric, and sixteen rollers will be in contact with the drum. Under such conditions, sixteen of the relays will be energized, and their corresponding switches 46 will be open, and conversely thirty-two of the switches will be closed. The result is that a current of 2 milliamperes for each closed switch, or a total of 64 milliamperes, will flow in the measuring circuit as indicated by ammeter 73, and, as explained above, this current will cause the ammeter 72 to indicate the fabric width as 58 inches.

Assume now that because of some change in the operation of the calender the width of the fabric increases to 59 inches. The result is that four more rollers will ride over the fabric out of contact with the drum 10, four additional relays 47 will be deenergized, four more switches 46 will close, and an additional amount of current of 8 milliamperes will flow through the measuring circuit, the current being raised to 72 milliamperes. This amount will be recorded by the ammeter 73 in amperes and by the ammeter 72 as 59 inches of fabric width. A corresponding decrease in fabric width would allow more rollers 12 to contact drum 10 and cause a corresponding decrease in the current flowing in the measuring circuit.

It will be apparent that a number of changes may be made in the apparatus without departing from the spirit of the invention. For example, the relays 47 could be omitted entirely and the elements 12 and 10 could be substituted directly for the switches 46.

Similar modifications and changes will occur to those skilled in the art within the scope of the invention, the features of which are summarized in the claims below.

What is claimed is:

1. Apparatus for continuously measuring the width of a sheet of material comprising a conducting surface electrically connected to a measuring circuit and adapted to support said material, a bank of contacts disposed adjacent said surface and adapted to have electrical contact therewith except when said material is interposed between said surface and said contacts, said measuring circuit having a source of substantially constant voltage and a plurality of resistances of predetermined value adapted to be connected into and out of said circuit, means connecting said resistances and said contacts respectively whereby said resistances are connected into said circuit when said contacts contact said material and are taken out of said circuit when said contacts bear against said surface.

2. Apparatus for continuously measuring the width of a sheet of insulating material as it passes over a drum comprising a bank of rollers disposed adjacent said drum and adapted to bear against said drum except when lifted out of contact therewith by said sheet, said drum having an electrical conducting surface, a measuring circuit electrically connected to said drum surface having a source of substantially constant voltage and a plurality of resistances of predetermined value adapted to be connected into and out of said circuit, means connecting said resistances and said rollers respectively whereby said resistances are connected into said circuit when said rollers contact said sheet and are out of said circuit when the rollers bear against said drum.

3. Apparatus for measuring the width of a continuously moving strip of insulating sheet material comprising a conducting surface over which said strip is adapted to move, a plurality of contacts disposed adjacent each of the longitudinal moving edges of said strip, said contacts electrically engaging said surface except where the sheet material is interposed therebetween, the contacts being positioned so that the number of contacts engaging said surface is a function of the width of said strip, an electrical measuring circuit having a plurality of resistances arranged in parallel, each of said contacts forming with said surface a switch connected respectively to one of said resistances whereby operation of said switches by the interposition of the strip between the contacts and said surfaces render the corresponding resistances effective in said circuit, means to maintain a constant voltage in said circuit whereby the current flowing in said circuit is a function of the number of effective resistances therein, and means to measure and indicate said current.

4. Apparatus for measuring the width of a continuously moving strip of insulating sheet material comprising a drum having a conducting surface over which said strip is adapted to move, a plurality of rollers disposed adjacent each of the longitudinal moving edges of said strip, said rollers having contact with said surface except where the sheet material is interposed therebetween, the contacts being positioned so that the number of rollers engaging said surface is a function of the width of said strip, an electrical measuring circuit having a plurality of resistances arranged in parallel, each of said rollers forming with said surface a switch connected respectively to one of said resistances whereby operation of said switches by the interposition of said strip between the contacts and said drum renders the corresponding resistances effective in said circuit, means to maintain a constant voltage in said circuit whereby the current flowing in said circuit is a function of the number of effective resistances therein, and means to measure and indicate said current.

5. The method of measuring the width of a continuously moving strip of insulating sheet material as it passes over a conducting surface which comprises passing an electric current from a source through a circuit into said conducting surface simultaneously at a plurality of spaced fixed points, interrupting said flow of current into said surface at a portion of said points by passing said strip over said surface to overlie said portion of said points, and continuously measuring the electrical characteristics in a portion of said circuit as said strip overlies more or less of said points according to the variation in the width thereof.

6. Apparatus for continuously measuring the width of calendered tire ply stock as it passes over a supporting drum comprising two banks of rollers adapted to bear against said drum, the rollers being mounted in rows extending longitudinally along said drum and transversely of said stock, said rollers being journalled for free idling rotation adjacent the marginal portions of said stock, said drum having a conducting surface connected to said rollers in parallel electrical circuits whereby current flows in said parallel circuits whenever the rollers respectively contact said drum surface, a measuring circuit connected to a source of constant voltage having a plurality of resistances of predetermined value, means connecting said parallel circuits respectively to said resistances are to take said resistances out of said measuring circuit when said rollers contact said stock and to connect said resistances into said circuit after their respective rollers have been in contact with said drum surface for an appreciable period of time.

7. Apparatus for measuring the width of a strip of insulating sheet material as it moves over a supporting drum comprising a plurality of rollers arranged in banks adjacent the edges of said strip and adapted to engage said drum except where said strip is interposed between said drum and said rollers, said rollers being arranged in regularly spaced positions whereby the number of contacts engaged by said strip depends on the width of the sheet, said drum having a conducting surface, said surface and said rollers respectively comprising a plurality of switches connected in parallel circuits, each of said parallel circuits having a solenoid energized when its associated roller engages said drum and de-energized when its roller engages said sheet, a measuring circuit connected to a source of constant voltage and having a plurality of resistances of predetermined value arranged in a plurality of resistance circuits comprising part of said measuring circuit, said resistance circuits each having a switch connected to and operable by said solenoids respectively, said solenoids and switches operating to cut the resistances into and out of said measuring circuit, whereby the current flowing in said measuring circuit is a function of the number of said resistances cut into said circuit by said solenoids.

8. Apparatus for measuring the width of a strip of insulating sheet material as it moves over a drum comprising a plurality of rollers arranged in two banks adjacent the edges of said strip and adapted to engage said drum except where said strip is interposed between said drum and rollers, said roller contacts being arranged in regularly spaced positions whereby the number of contacts engaging said strip is a function of the width of the strip, said drum having a conducting surface, said surface and said rollers comprising a plurality of switches connected in parallel circuits, each of said parallel circuits having a relay energized when the corresponding roller contacts said drum and de-energized when the corresponding roller engages said strip, a measuring circuit having a plurality of resistances of predetermined value arranged in parallel resistance circuits, said resistance circuits being connected to and operable by said relays respectively to cut the resistances in said circuits into and out of said measuring circuit, said measuring circuit having a constant voltage source of power whereby the current in said measuring circuit is a function of the number of said resistances cut into said circuit by said relays, and connected in said measuring circuit to measure said current.

9. Apparatus for measuring the width of a strip of insulating material as it moves over a supporting drum comprising a plurality of rollers arranged in banks adjacent the moving edges of said strip and adapted to engage said drum except where said strip is interposed between said drum and rollers, said rollers being disposed in regularly spaced positions whereby the number of rollers engaging said strip is a function of the width of the strip, said drum having a conducting surface, said surface and said rollers respectively comprising a plurality of switches connected in parallel circuits, each of said parallel circuits having a relay, said relay being energized when its associated roller engages said drum and being de-energized when its roller engages said strip, a measuring circuit having a plurality of resistances of predetermined value arranged in parallel resistance circuits comprising part of said measuring circuit, said resistance circuits being connected to and operable by said relays respectively to cut the resistances in said circuits into and out of said measuring circuit, a constant voltage source of power for said measuring circuit including a battery and means to provide a varying trickle charge to said battery for maintaining a substantially constant voltage in said measuring circuit, whereby the current in said measuring circuit is a function of the number of said resistances cut into said circuit by said relays, and an ammeter to measure said current.

References Cited in the file of this patent

UNITED STATES PATENTS

| | | |
|---|---|---|
| 730,491 | Thomson | June 9, 1903 |
| 741,881 | Bright | Oct. 20, 1903 |
| 818,601 | Beals | Apr. 24, 1906 |
| 2,272,745 | Hinds et al. | Feb. 10, 1942 |
| 2,311,574 | Richards | Feb. 16, 1943 |
| 2,569,433 | Highberg et al. | Sept. 25, 1951 |

FOREIGN PATENTS

| | | |
|---|---|---|
| 329,753 | Italy | Sept. 20, 1935 |